United States Patent [19]

Ueno et al.

[11] Patent Number: 4,999,661
[45] Date of Patent: Mar. 12, 1991

[54] CAMERA HAVING SELECTIVE FUNCTIONS

[75] Inventors: Fuminori Ueno, Hachioji; Yutaka Ohsawa, Tokyo, both of Japan

[73] Assignee: Asahi Kogaku Kogyo Kabushiki Kaisha, Tokyo, Japan

[21] Appl. No.: 439,844

[22] Filed: Nov. 21, 1989

[30] Foreign Application Priority Data

Nov. 22, 1988 [JP] Japan ................................. 63-295769

[51] Int. Cl.$^5$ .......................... G03B 7/00; G03B 13/36
[52] U.S. Cl. ...................................... 354/402; 354/412
[58] Field of Search ...................... 354/402, 412, 289.1, 354/289.12, 21

[56] References Cited

U.S. PATENT DOCUMENTS 4,643,557  2/1987  Ishizaki et al. ....................... 354/406

FOREIGN PATENT DOCUMENTS 1156174   6/1969  United Kingdom .
2015760   9/1979  United Kingdom .
2065906   7/1981  United Kingdom .
2141096  12/1984  United Kingdom .

Primary Examiner—W. B. Perkey
Attorney, Agent, or Firm—Sandler, Greenblum & Bernstein

[57] ABSTRACT

A function selective camera having a CCD distance measuring sensor comprising a code table containing optical codes expressing a plurality of selective and changeable functional conditions and/or data of the camera. The code table is provided separately from the camera. A function selecting means converts a code formed on the code table into a predetermined optical code which can be decoded by the CCD distance measuring sensor. Control means provided on a camera body enables a photographer to select or change the functional conditions of the camera on the basis of the code read by the CCD distance measuring sensor.

22 Claims, 4 Drawing Sheets

CAMERA HAVING SELECTIVE FUNCTIONS

BACKGROUND OF THE INVENTION

1. Field of the Invention

The present invention relates to a camera which is equipped with an automatic focusing device, particularly a camera having a CCD distance measuring sensor and selective functional conditions, modes or data.

2. Description of Related Art

There has recently been a remarkable development in the technology of achieving multifunctional single-lens reflex cameras having an automatic focusing device (hereinafter referred to as "AF single-lens reflex cameras"). However, it is almost impossible to completely satisfy each individual user's demands with a single camera from the viewpoint of size, weight and cost.

Under these circumstances, there has been proposed a function selective camera that is designed to satisfy each individual user's demands as much as possible. More specifically, a plurality of IC cards, each incorporating a ROM stored with functional condition information to be selected, are prepared so that each individual user can select a desired one of these IC cards and insert it into a holder provided on the camera body to use the desired functional condition, thus expanding the functions of the camera.

Such a function selective camera employing IC cards, each of which incorporates a ROM, unavoidably increases the camera cost since the IC cards themselves are costly and the hardware used to handle these IC cards is complicated.

SUMMARY OF THE INVENTION

It is a primary object of the present invention to provide a camera which enables the selection of a desired functional condition or data at a reduced cost and with ease, without employing IC cards.

The present invention was made by noting that the CCD distance measuring sensor for automatically focusing, which is provided on AF cameras acts as a kind of line sensor.

The present invention provides a camera which is equipped with an automatic focusing device having a CCD distance measuring sensor and which enables the selection of a plurality of functional conditions and/or data concerning the camera functions, wherein the improvement comprises: a code table containing codes expressing information concerning the plurality of functional conditions and/or data, the code table being provided separately from the camera; an optical system for forming an image of the code table on the CCD distance measuring sensor; and functional condition selection control means for analyzing the image of the code formed on the CCD distance measuring sensor on the basis of the output of the sensor and rewriting the functional conditions or data stored in a memory.

By virtue of the above-described arrangement, the conventional CCD distance measuring sensor for auto focusing and control means (microcomputer) can be utilized as hardware means without making any changes is therefore possible to select a desired functional condition simply by preparing patterns that represent information concerning a plurality of selective functional conditions and/or data of the camera.

DETAILED DESCRIPTION

Figure 1:
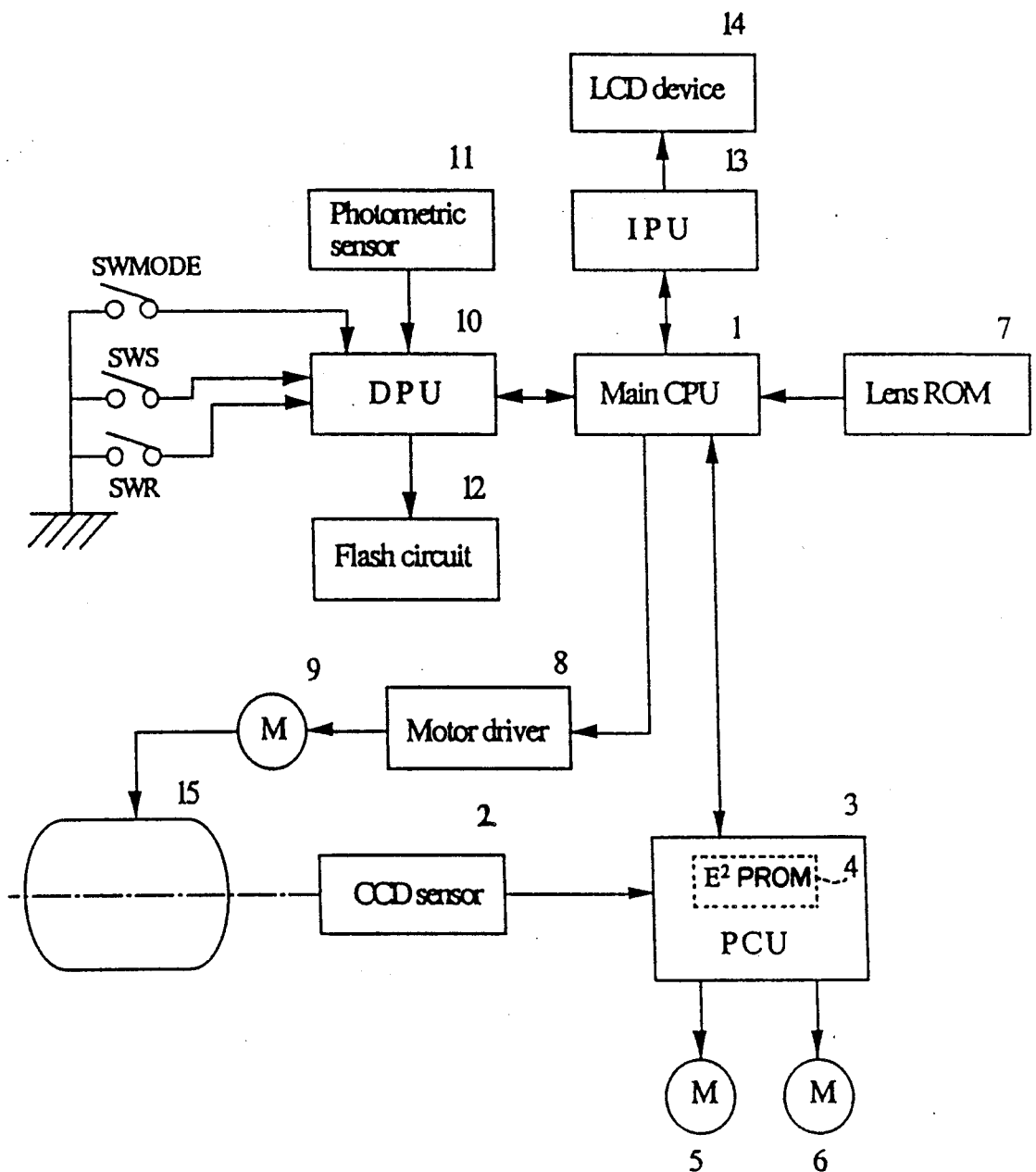
FIG. 1 is a block diagram showing an essential part of the circuit configuration of one embodiment of the function selective camera according to the present invention.

A function selective camera according to the present invention will be described below by way of one embodiment with reference to the accompanying drawings. FIG. 1 is a block diagram that schematically shows the main elements constituting a control part of an AF single-lens reflex camera to which the present invention is applied. Although the camera of this embodiment is provided with a TTL phase difference detection type AF device, the arrangement of the AF device is known and not related directly to the subject matter of the present invention; therefore, a detail description thereof is omitted.

A main CPU (microcomputer) 1 functions as a control means that generally controls various functions of the camera and performs calculations concerning automatic focusing. A PCU (Power Control Unit) 3, a lens ROM 7, a DPU (Data Processing Unit) 10 and an IPU (Indication Processing Unit) 13 are connected to the main CPU 1 through respective data buses.

A CCD distance measuring sensor 2, for automatic focusing has, although not shown, a large number of photoelectric transducers (photodiodes), as is well known, which are disposed in a straight line on the same light-receiving surface while being equally spaced. An image of the object is led to the AF optical system through a photographing lens 15 and a pair of main and sub mirrors 35, 37 (see FIG. 2). In the AF optical system, the object image is divided into two, which are then formed on the light-receiving surface of the CCD distance measuring sensor 2. The object images formed on the light-receiving surface are converted into signal charges by the photoelectric transducers and the signal charges are integrated (accumulated). The value of the integrated signal charges is sent in the form of an analog video signal to the PCU 3 for each photoelectric transducer, where it is amplified and the amplified signal is sent to the main CPU 1.

The main CPU 1 converts the amplified analog video signal to a digital signal and performs a calculation (predictor calculation) thereon by using a correlation method using the digital signal as a parameter to obtain a phase difference, that is, a defocus value, between the two object images formed on the light-receiving surface. Then, a direction and amount of rotation of an AF motor 9 are calculated on the basis of the defocus value so that the camera is focused on the object, and the AF motor 9 is driven through a motor driver 8 on the basis of the calculated values. The above-described main CPU 1, CCD distance measuring sensor 2, PCU 3, motor driver 8 and AF motor 9 constitute in combination an automatic focusing device.

The PCU 3 includes an E²PROM 4 which is electrically erasable and programmable, in addition to the control part that has the function of effecting integration control with regard to the CCD distance measuring sensor 2, the video signal processing function and the function of interfacing the CCD distance measuring sensor 2 with the main CPU 1.

The E²PROM 4 has been stored with data concerning selective functions and functional conditions of this camera. Among the stored data, those concerning functional conditions which are to be used for photographing are written in the E²PROM 4 and rewritten according to circumstances.

The PCU 3 further has the function of effecting drive control of a mirror/shutter driving motor 5 and a film feed motor 6 in response to instructions from the CPU 1. The film feed motor 6 winds and rewinds the film through a known mechanism.

The lens ROM 7 is mounted on the photographing lens 15 and connected to the main CPU 1 through a connection made by a connecting pin provided on the mount surface. The lens ROM 7 has been stored with information concerning the full aperture, minimum aperture, focal distance, etc. in regard to the photographing lens 15. The information is read out in response to a read signal from the main CPU 1. The main CPU 1 drives the AF motor 9 through the motor driver 8 on the basis of the data from the lens ROM 7 and the PCU 3.

The DPU 10 executes a photometric calculation on the basis of film speed data and a photometry start signal which are delivered thereto from the main CPU 1. More specifically, the DPU 10 receives an analog photometric signal from a photometric sensor 11, subjects this signal to a logarithmic compression and A/D conversion, executes a predetermined calculation on the basis of the digital photometric value and the above-mentioned film speed to obtain a correct exposure value, and sends the correct exposure value to the main CPU 1.

To the DPU 10 are connected various switches, i.e., a photometry switch SWS, a release switch SWR and a bar code input mode (functional condition select mode) setting switch SWMODE. The DPU 10 sends information concerning these switches to the main CPU 1. When the photometry switch SWS is turned on, the main CPU 1 calculates an exposure value EV on the basis of photometric data from the photometric sensor 11 and executes an automatic focusing operation, such as the driving of the CCD distance measuring sensor 2. When the bar code input mode setting switch SWMODE is turned on, the main CPU 1 enters into the bar code input mode. It should be noted that, although in this embodiment a special-purpose switch for setting the bar code input mode is provided, the arrangement may be such that a switch for selecting another selective mode is adapted to also serve as a bar code input mode setting switch and the bar code input mode is included in another selective mode.

The DPU 10 further executes flash control and flash top control of a flash circuit 12.

IPU 13 instructs an LCD device 14 to provide a predetermined display on the basis of various data delivered from the main CPU 1. The LCD device 14 displays in a concentrated manner information concerning the camera functions and photographing, for example, loading, winding and rewinding of film, film speed, the number of exposed frames of film, exposure modes, i.e., programmed automatic exposure mode and manual exposure mode, and strobe information.

Figure 2:
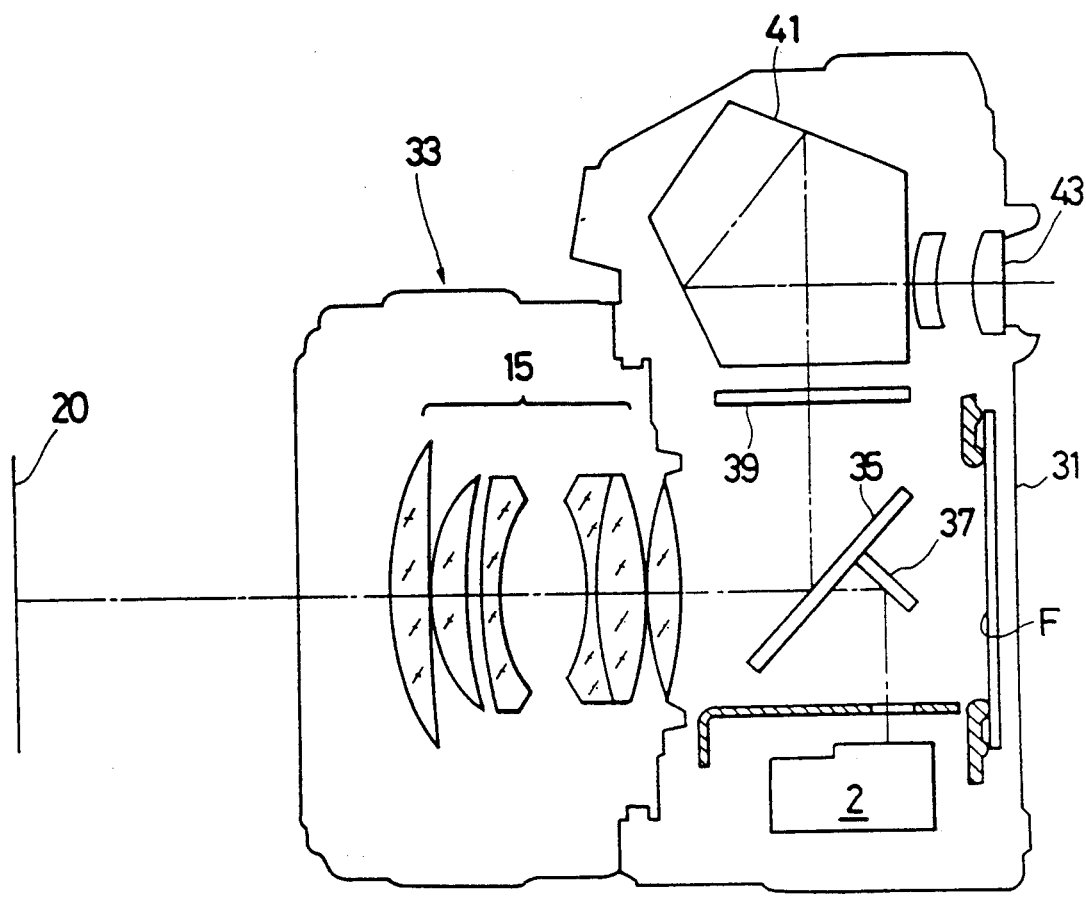
FIG. 2 is a sectional view showing a optical system of a single-lens reflex camera loaded with the circuit shown in FIG. 1, which is taken along the optical axis of the optical system.

FIG. 2 is a sectional view showing the optical system of a single-lens reflex camera loaded with the circuit shown in FIG. 1, which is taken along the optical axis of the optical system. The single-lens reflex camera is arranged such that a photographing lens 33 is detachable with respect to the camera body 31. The bundle of rays from the object which enters through the photographing lens 33 (15) is partially transmitted by the half-mirror portion of the main mirror 35 and reflected from the sub mirror 37 towards the CCD distance measuring sensor 2. The other part of the incident light is reflected from the main mirror 35 towards a pentaprism 41. The light-receiving surface of the CCD distance measuring sensor 2 is disposed at a position which is optically equivalent to the film surface F. The bundle of rays from the object that is reflected from the main mirror 35 passes through a focusing screen 39 and enters the pentaprism 41, where it is reflected so as to emerge through an eyepiece lens 43. It should be noted that the focusing screen 39 is formed with a distance measuring frame 23 that indicates a distance measuring zone (to be described below).

The foregoing arrangement is known, and the following is a description of the features of the present invention. In the present invention, a plurality of selective functions of the camera and changeable data are each converted into an optical pattern, which is read by the above-described CCD distance measuring sensor 2 and decoded in the main CPU 1 to select and/or change the corresponding function and data. The arrangement of the present invention will be explained below by way of an example.

Figure 3:
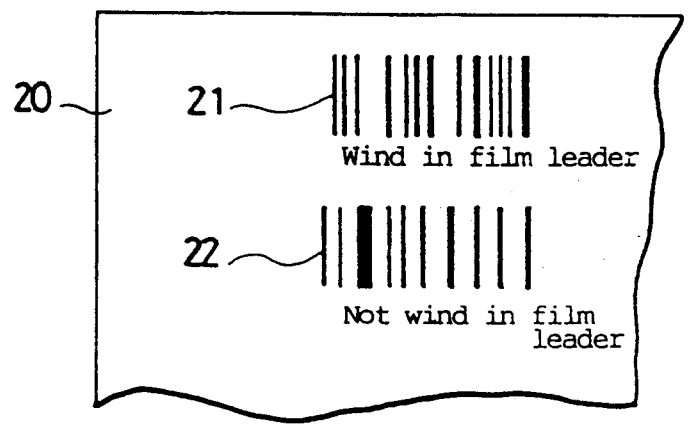
FIG. 3 is a front view showing one example of a code table printed with bar codes representing functional conditions and data which is applied to the embodiment.

FIG. 3 shows a code table 20 containing selective functional conditions and data which are encoded in the form of bar codes as one example of optical patterns. The code table 20 is a white table on the surface of which are drawn black bar codes 21 and 22, together with the functional conditions or data contents represented thereby. In this example, bar codes 21 and 22 indicate whether or not the leader portion (forward end) of the film is to be wound into the cartridge (patrone) when the film is rewound. The bar code 21 represents the condition of "wind in", whereas the bar code 22 represents the condition of "not wind in".

Figure 4:
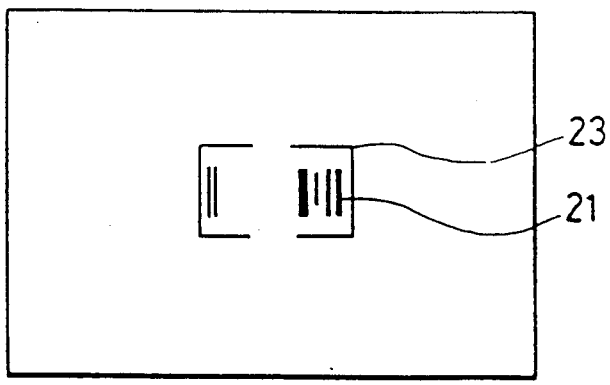
FIG. 4 shows the relationship between a bar code, the distance measuring zone and the finder field of view when a functional condition is selected.

In this example, the overall width of the bar codes 21 and 22 is set so as to be substantially equal to or greater than the width of the distance measuring frame 23 when the code table 20 is placed at the closest focusing distance of the photographing lens 15 (see FIG. 4). In other words, the size of the bar codes 21 and 22 is set so that the image of each bar code is coincident with the photoelectric transducer array of the CCD distance measuring sensor 2 when the code table 20 is placed at the closest focusing distance of the photographing lens 15.

It should be noted that in the present invention a special-purpose lens may be employed. In such a case also, the width of the bar codes 21 and 22 is determined so that the image of each bar code is coincident with the photoelectric transducer array of the CCD distance measuring sensor 2 at a predetermined focusing distance. In addition, a mark, for example, a frame for positioning a bar code, is provided in the finder field of view.

When the image of the bar code 21 or 22 is formed on the light-receiving surface of the CCD distance measuring sensor 2, each photoelectric transducer performs an integration in correspondence with a black or white bar. More specifically, the light or dark image of each of the bars constituting the bar code 21 or 22 is subjected to integration in the corresponding photoelectric transducer.

The values thus obtained by integration are sequentially output to the main CPU 1 through the PCU 3. The main CPU 1 converts the obtained values into digital signals and decodes the combination of digital signals. If the present bar code is judged to be the bar code 21, the main CPU 1 rewrites into the E$^2$PROM 4 the condition to wind the film leader 111 to the patrone, whereas, if the bar code is judged to be the bar code 22, the main CPU 1 rewrites the condition into the E$^2$PROM 4 to "not wind in".

By virtue of the above-described rewriting, when the film is afterward rewound, the film feed motor 6 is suspended in accordance with the rewritten condition. It should be noted that, if the above-mentioned read condition is the same as the condition which has already been written, rewriting is not needed. If the read data is not coincident with any of the data stored in advance, it means a read error; therefore, no rewriting is executed.

The following is a description of examples of selective functions or functional conditions or data for the camera according to the present invention:

(A) whether or not the film leader is to be wound into the cartridge when the film is rewound;
(B) auto-return: "ON (necessary)" or "OFF (unnecessary)";
(C) film counter: "forward counting" or "reverse counting";
(D) film speed: "DX priority" or "manual set ISO priority";
(E) restriction of exposure mode e.g., programmed exposure only, only programmed exposure and ES (shutter priority automatic exposure), only programmed exposure and EE (aperture priority automatic exposure), etc.;
(F) whether or not strobe flashing is to be allowed when the view angle of the built-in strobe does not conform to i.e. the photographing lens (the view angle thereof) being used,
(G) programmed line: "shiftable" or "unshiftable";
(H) whether or not AF (focusing) lock and AE (exposure value Ev) are to be set together;
(I) stepwise change of shutter speed: e.g., every 1EV or 0.5EV;
(J) exposure mode (programmed exposure mode, aperture priority automatic exposure mode, shutter priority automatic exposure mode, manual exposure mode, etc.);
(K) drive mode (continuous shooting drive mode, single-frame shooting drive mode, self-timer drive mode, self-timer drive mode in which three frames are exposed in series, AE lock drive mode, AF lock drive mode, etc.); and
(L) light metering mode (evaluation light metering, averaged overall light metering, spot light metering, etc.).

All of these functional conditions can be selected by means of bar codes.

However, it is unlikely that functional conditions (A) to (I) will be changed during photographing once they since these are set functional conditions are those which determine the specifications of the camera, whereas the functional conditions (J) to (L) are often selected or changed during photographing.

Therefore, to facilitate the functional condition selecting operation, the arrangement may be made wherein functional conditions (A) to (I), for example, are selected or changed by means of bar codes, while functional conditions (J) to (L), for example, are selected or changed by actuating switches.

The above-described functional conditions (A) to (I) are printed on the code table 20 in advance in the form of bar codes, as shown in FIG. 3. The functional conditions (A) to (I) may be printed on a single code table or may be printed on separate code tables which are provided, respectively, for groups of functional conditions.

To select the functional conditions (A) to (I), a mode change switch, that is mounted on the camera body, is set to the functional condition input mode.

It should be noted that, if the number of selective functional conditions is greater than the number of data which can be discriminated by means of bar codes, two or more sets of bar codes can be utilized. For instance, the address of functional conditions or data is designated by a first bar code and the content of the functional condition is specified by a subsequent bar code.

The bar code concerning the contents of a functional condition can be, for example, arranged such that each bar represents the numerical value of an inflection point on the programmed line.

Figure 5:
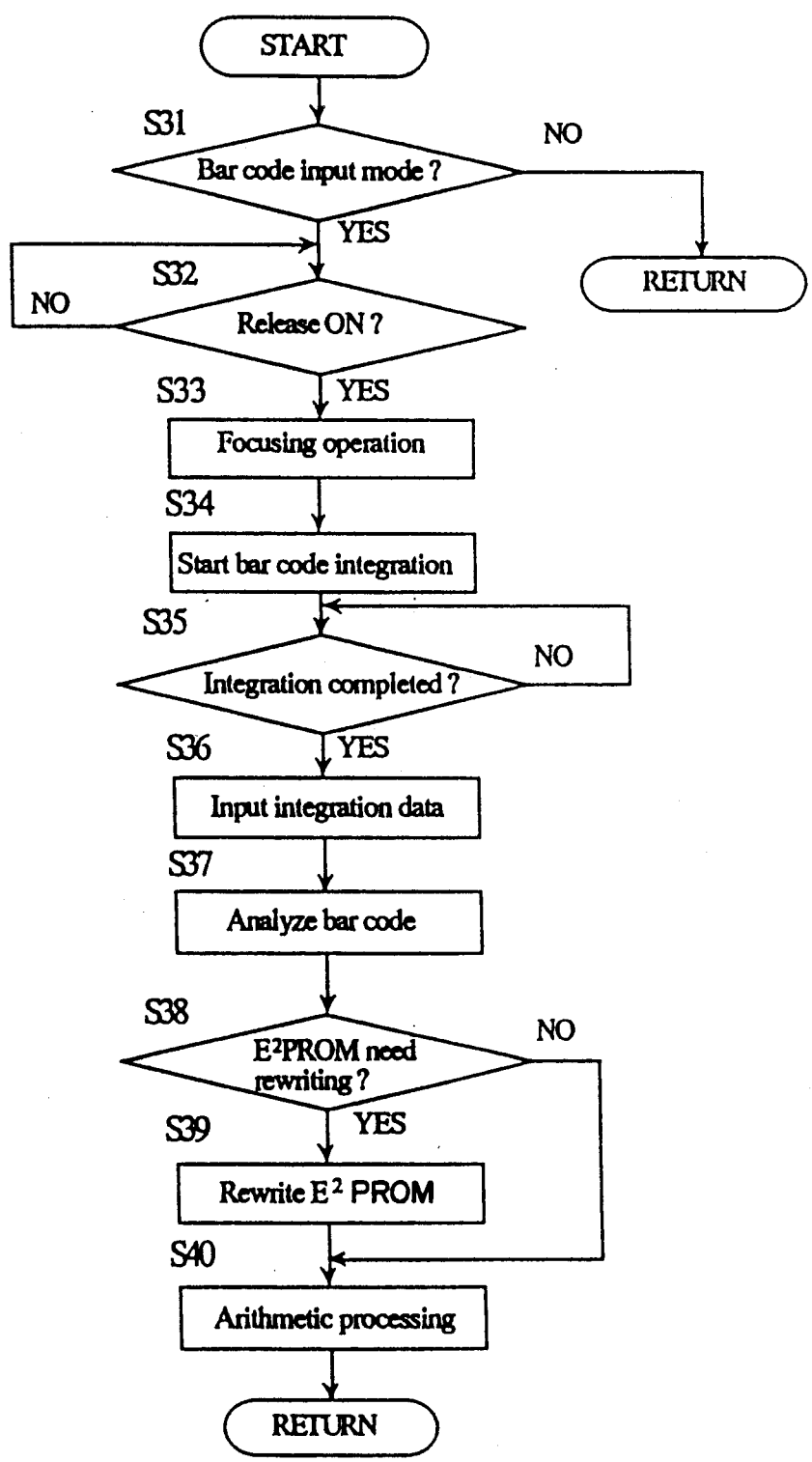
FIG. 5 is a flowchart relating to the bar code input operation of the embodiment.

The operation of the main CPU 1, with regard to the functional condition selecting operation of the functional condition selective camera, according to the present invention, arranged as detailed above, will be explained below with reference to the flowchart shown in FIG. 5. This operation is executed by the main CPU 1 according to one of the subroutines of the program stored in the ROM of the main CPU 1.

First, Step S31 determines whether the bar code input mode has been set through the bar code input mode setting switch SWMODE of the camera. If the answer is no, the process returns to the main routine for effecting light metering, AF control, etc., whereas, if the bar code input mode has been set, the process proceeds to Step S32.

In Step S32, the camera waits until the switch which is actuated to start rewriting the function (mode), that is, the release switch SWR in this embodiment, is turned on. At this time, the photographer directs the camera to the bar code (bar code 21 in this example) on the code table 20 concerning the functional conditions to be selected and, after aligning the bar code 21 to the distance measuring frame 23 within the finder field of view, the photographer turns on the release switch SWR.

As the release button is turned on, the process proceeds to Step S23, where a focusing operation is executed to focus the camera on the bar code 21. Then, the process proceeds to Step S34.

In Step S34, integration of the image of the bar code 21 formed on the CCD distance measuring sensor 2 is started, and the completion of the integration is awaited in Step S35. Upon the completion of the integration, the process proceeds to Step S36.

In Step S36, an integration value representing each bar is amplified in the PCU 3 and outputted to the CPU 1, where an A/D conversion is carried out. The process then proceeds to Step S37.

In Step S37, the digital signals concerning the bars of the bar code 21 are decoded.

In Step S38, the result of the decoding is checked to determine whether the data stored in the E²PROM 4 needs to be rewritten. If the answer is YES, the process proceeds to Step S39, to rewrite data is whereas, if the answer is NO, the process jumps to Step S40.

If the CPU 1 determines in Step S38 that the data stored in the E²PROM 4 needs to be changed, the data in the E²PROM 4 is rewritten in Step S39. Since, in this example, the bar code 21 represents the condition of "the film leader is to be wound in" in the functional condition (A), the data in the E²PROM 4 is rewritten so as to select the condition of "the film leader is to be wound in" from among the film winding conditions in the subroutines concerning the film rewinding operation. It should be noted that the judgement as to whether or not the data in the E²PROM 4 needs to be changed may be omitted and all the data may be rewritten, but since there is a possibility that a bar code read error will occur, Step S38 is provided to prevent destruction of the data by the read error.

In Step S40, other arithmetic processings in the bar code read mode, for example, the process of changing the programmed line for programmed exposure on the basis of the data represented by the bar code, are executed, and the process then returns.

Thus, the functional condition changing the process is completed, and thereafter, photographing can be performed with the changed function.

Thus, according to the present invention, data concerning a plurality of selective functional conditions are encoded to form a code display means, the code image is detected by means of a CCD distance measuring sensor for automatic focusing, the detected pattern is decoded by a control means, and a given function or functional condition or data is rewritten by the control means on the basis of the decoded code. Therefore, it is possible to provide a camera that satisfies each individual user's demands without the need to provide the camera body with additional devices or a large number of function select switches.

Since no additional device needs to be provided on the camera, it is possible to produce a camera which is inexpensive, light and compact.

According to the present invention, any desired functional condition can be selected from among a large number of functional conditions in accordance with each particular photographing purpose or the user's preference and the number of actuating switches is relatively small. Therefore, it is possible to expand the range of photographing application while relieving the user of troublesomeness in operation.

Although the present invention has been described by way of the illustrated embodiments, the present invention is not necessarily as a matter of can limited to these embodiments.

Although in the foregoing embodiments bar codes are exemplarily used as an encoded form of data concerning the functional conditions, the essential thing is to encode the functional conditions and data in the form of pattens which can be decoded by use of the CCD distance measuring sensor 2. There is no restriction on the method of forming the patterns and the configuration thereof. The distance measuring sensor is not necessarily limited to the CCD distance measuring sensor and a MOS type distance measuring sensor may also be employed. It is also possible to employ a line sensor or a two-dimensionally extending image-pickup device, provided that it is capable of discriminating optical codes.

A combination of a code table and a code reading lens which are assembled together in one unit may also be employed as a code reading means. More specifically, a lens is detachably provided on the camera mount and a code table made of a light-transmitting material, or a code table illuminated with the ambient light or by a built-in lamp, is provided on the focal plane of the lens, such that the code table is movable on the plane perpendicularly intersecting the optical axis.

According to the foregoing arrangement, it is possible to readily select a functional condition simply by turning on the mode select switch with a desired bar code positioned within the distance measuring frame in the finder field of view. In other words, the camera need not perform the AF operation and the photographer need not place the code table in position, direct the camera to the bar code and move the camera back and forth so that the bar code is coincident with the distance measuring frame, or conduct a zooming operation.

I claim:

1. A function selective camera which is equipped with an automatic focusing device having a CCD distance measuring sensor and which enables the selection of a plurality of functions and/or data concerning camera functions, wherein the improvement comprises:

a code table containing codes expressing information concerning said plurality of functions and/or data, said code table being provided separately from said camera;

an optical system for forming an image of said code table on said CCD distance measuring sensor; and a function selecting means for analyzing said image of said code formed on said CCD distance measuring sensor on the basis of an output of said sensor and rewriting said functions or data stored in a memory.

2. A function selective camera according to claim 1, wherein said optical system comprises a photographing lens attached to a camera body.

3. A function selective camera according to claim 1, wherein said codes are optical bar codes formed on a surface of said code table.

4. A function selective camera according to claim 1, wherein information concerning a plurality of selective functions and/or data of said camera is provided on separate code tables which are provided, respectively, for predetermined groups of pieces of information.

5. A function selective camera according to claim 1, wherein said codes concerning a plurality of selective functions and/or data of said camera are provided on a single code table.

6. A function selective camera which is equipped with an automatic focusing device having a CCD distance measuring sensor and which enables the selection of a plurality of functions and/or data concerning camera functions, wherein the improvement comprises:

a code table containing codes expressing information concerning said plurality of functions and/or data, said code table being provided separately from said camera;

an optical system for forming an image of said code table on said CCD distance measuring sensor;

a function selecting means for analyzing said image of said code formed on said CCD distance measuring sensor on the basis of an output of said sensor and rewriting said functional conditions or data stored in a memory; and mode setting means having a functional condition select mode in which said function selecting means is activated to execute rewriting of said functional conditions, said function selecting means being arranged such that, in said functional condition select mode, said function selecting means decodes said image of the code formed on said CCD distance measuring sensor on the basis of said output of said CCD distance measuring sensor, to determine whether the functional conditions or data of said camera stored in said memory needs to be rewritten, and to rewrite said functions or data when it is determined to be necessary to rewrite said functional conditions on data to said memory.

7. A function selective camera according to claim 6, wherein said optical system comprises a photographing lens attached to a camera body.

8. A function selective camera according to claim 6, wherein said codes comprise optical bar codes formed on a surface of said code table.

9. A function selective camera according to claim 6, wherein information concerning a plurality of selective functional conditions and/or data of said camera is provided on separate code tables which are provided, respectively, for predetermined groups of pieces of information.

10. A function selective camera according to claim 6, wherein said codes concerning a plurality of selective functional conditions and/or data of said camera are provided on a single code table.

11. A function selective camera according to claim 6, wherein, when said functional condition select mode is selected by said mode setting means, said function selecting means activates said automatic focusing device on condition that a release actuating means is actuated to focus on one of said codes, decodes said image of said code formed on said CCD distance measuring sensor on the basis of said output of said CCD distance measuring sensor, judges whether said functional conditions or data of said camera stored in the memory needs to be rewritten, and rewrites said functional conditions or data when it is determined to be necessary to rewrite said functional conditions or data to said memory.

12. A function selective camera according to claim 11, wherein said optical system comprises a photographing lens attached to the camera body.

13. A function selective camera according to claim 11, wherein said codes comprise optical bar codes formed on said surface of said code table.

14. A function selective camera according to claim 11, wherein information concerning a plurality of selective functional conditions and/or data of said camera is provided on separate code tables which are provided, respectively, for predetermined groups of pieces of information.

15. A function selective camera according to claim 11, wherein said codes concerning a plurality of selective functional conditions and/or data of said camera are provided on a single, code table.

16. A function selective camera which is equipped with an automatic focusing device having a line sensor and which enables the selection of a plurality of functional conditions and/or data concerning camera functions, wherein the improvement comprises:

a code table containing optical codes expressing information concerning said plurality of functional conditions and/or data, said code table being provided separately from said camera;

an optical system for forming an image of said code table on said line sensor; and a function selecting means for analyzing said image of said code formed on said line sensor on the basis of an output of said sensor and rewriting said functional elements or data stored in a memory.

17. A function selective camera according to claim 16, wherein said optical system comprises a photographing lens attached to a camera body.

18. A function selective camera according to claim 16, wherein said codes comprise optical bar codes formed on a surface of said code table.

19. A function selective camera according to claim 16, wherein information concerning a plurality of selective functional conditions and/or data of said camera is provided on separate code tables which are provided, respectively, for predetermined groups of pieces of information.

20. A function selective camera according to claim 16, wherein said codes concerning a plurality of selective functional conditions and/or data of said camera are provided on a single code table.

21. A method for selecting a function for a camera which is equipped with an automatic focusing device having a CCD distance measuring sensor and which enables the selection of a plurality of functions and/or data concerning camera functions, comprising:

a first step at which a code table containing codes expressing information concerning said plurality of functions and/or data is focused on the CCD distance measuring sensor, a second step at which an image of the code formed on the CCD distance measuring sensor on the basis of an output of the sensor is analyzed; and a third step at which the functions and/or data stored in a memory are rewritten on the basis of the analyzed code.

22. A method for selecting a function for a camera which is equipped with an automatic focusing device having a CCD distance measuring sensor and which enables the selection of a plurality of functions and/or data concerning camera functions comprising:

a first step at which a code table containing codes expressing information concerning the plurality of functions and/or data is focused on the CCD distance measuring sensor, a second step at which an image of the code formed on the CCD distance measuring sensor on a basis of the output of the sensor is analyzed;

a third step at which it is determined whether the functional conditions or data of the camera, stored in the memory needs, to be rewritten; and a fourth step at which the functions or data stored in the memory are rewritten on the basis of the analyzed code when it is determined that the functional conditions or data of the camera stored in the memory needs to be rewritten.

* * * * *